United States Patent [19]

Lichtin et al.

[11] 4,443,311

[45] Apr. 17, 1984

[54] METHOD FOR MAKING AMINO ACIDS

[75] Inventors: Norman N. Lichtin, Newton Center, Mass.; Elliot Berman, Los Angeles, Calif.

[73] Assignee: Atlantic Richfield Company, Los Angeles, Calif.

[21] Appl. No.: 516,066

[22] Filed: Jul. 22, 1983

[51] Int. Cl.³ ............................................. B01J 19/12
[52] U.S. Cl. ............................................... 204/158 R
[58] Field of Search ..................... 204/158 N, 157.1 R

[56] References Cited

U.S. PATENT DOCUMENTS 3,756,934  9/1973  Sagan et al. .................... 204/158 N
4,113,590  9/1978  Schranzer et al. ........... 204/157.1 R

*Primary Examiner*—Howard S. Williams
*Attorney, Agent, or Firm*—Roderick W. MacDonald

[57] ABSTRACT

A method for making amino acids wherein a mixture of nitrogen and carbon dioxide is exposed to light and a source of hydrogen in the presence of at least one Group VIII metal oxide.

13 Claims, No Drawings

METHOD FOR MAKING AMINO ACIDS

BACKGROUND OF THE INVENTION

Heretofore, the photocatalytic reduction of carbon dioxide in the presence of water into various organic compounds such as formaldehyde and methanol has been accomplished using various chemical compounds such as titanium dioxide, tungsten trioxide, lead oxide, iron oxide, calcium titanate, silicon carbide, and the like. See "Photoreduction of Carbon Dioxide and Water into Formaldehyde and Methanol on Semiconductor Materials" by Aurian-Blajeni, Halmann and Manassen, Solar Energy, Vol. 25, pp. 165–170, 1980. This photocatalytic process does not employ any physically separate electrodes or special electrolyte as does the classical electrolytic cell or photoelectrochemical cells as will be discussed in greater detail hereinafter. This photocatalytic process merely employs a catalytic material, preferably, dispersed in a carrier liquid for better carbon dioxide contacting purposes. The material to be reduced such as carbon dioxide, is brought into contact with the catalyst using light as a source of the energy of reduction.

Also heretofore, photoelectrochemical cells which employ two physically separate electrodes combined with a special electrolyte solution have been used to reduce carbon dioxide or the bicarbonate ion to organic compounds such as formaldehyde, methanol, and formic acid. These cells have employed silicon metal as one of the physically separate electrodes and carbon or the like as the counter electrode. In the operation of these cells at least part of the required energy of reduction is supplied by light energy, including solar radiation. See U.S. Pat. No. 4,219,392, issued Aug. 26, 1980 to Halmann.

Also, heretofore, the photoreduction of nitrogen to ammonia has been reported using titanium dioxide alone or doped with iron, cobalt, molybdenum, and nickel. See "Photolysis of Water and Photoreduction of Nitrogen on Titanium Dioxide", Journal of the American Chemical Society, Vol. 99, pp. 7189–7193, 1977. This reference also discloses that enhancement of ammonia production was not obtained where numerous other metals such as chromium, copper, palladium, silver, and vanadium were used as dopants for $TiO_2$ thereby demonstrating the lack of predictability in this area.

BRIEF SUMMARY OF THE INVENTION

Accordingly, it was surprising to discover that when a mixture of nitrogen and carbon dioxide is exposed to visible light in the presence of at least one Group VIII metal oxide, a substantial number of amino acids was formed including a number of amino acids which are considered essential in the diets of humans.

There is provided, according to this invention, a method for making amino acids by way of a light driven photocatalytic reaction between nitrogen and carbon dioxide using at least one Group VIII metal oxide as the catalyst and exposure time, exposure conditions, and an amount of said catalysts which are effective for the formation of said amino acids.

Accordingly, it is an object of this invention to provide a new and improved method for making amino acids.

It is another object to provide a new and improved method for a light driven photocatalytic process for making amino acids.

Other aspects, objects and advantages of this invention will be apparent to those skilled in the art from this disclosure and the appended claims.

DETAILED DESCRIPTION OF THE INVENTION

In accordance with this invention, a mixture of nitrogen, carbon dioxide, and a hydrogen source is exposed to visible light in the presence of at least one Group VIII metal oxide under conditions favorable for the formation of amino acids.

The mixture of nitrogen and carbon dioxide is preferably gaseous. Any volume ratio of nitrogen and carbon dioxide is useful in this invention.

The light to which this mixture is exposed can vary widely and is preferably in the sunlight range, still more preferably is sunlight.

Any source of hydrogen can be employed. Water, liquid and/or vaporous, is quite useful as a hydrogen source.

The catalyst or catalysts employed in the process of this invention are preferably employed in a finally subdivided form such as in a powder form, although the extent of subdivision is not critical so that this parameter need not be quantitatively set forth in order to inform one skilled in the art. The catalyst is also preferably employed while dispersed in an aqueous medium so that very intimate mixing of the gaseous reactants with the catalyst can be obtained by simply bubbling the gaseous reactants through the catalyst containing aqueous medium. Generally, any aqueous medium can be employed which is nondeleterious to the reactants and catalyst and which is clear enough to transmit light to the reactants and the catalyst contained in the medium.

The catalyst itself is preferably selected from the group of oxides of cobalt, nickel, iron, and combinations of two or more thereof, still more preferably iron oxide, particularly an iron oxide which is predominately $Fe_2O_3$, i.e. the majority of which is ferric oxide. The amount of catalyst employed in an aqueous medium can vary widely depending upon the catalyst and a specific amount employed is not critical so long as it is sufficient to promote the formation of the desired amino acids.

The catalyst can commonly, for use in the process of this invention, be preconditioned by heating at ambient pressures in air, an inert atmosphere, or hydrogen, said heating being carried out at a temperature of from about 20° C. to about 600° C. for at least 1 hour, preferably from about 1 hour to about 48 hours. The particular metal oxide and the light employed are preferably adjusted so that the light employed has a wavelength range such that at least part of that light is absorbed by the metal oxide present.

The process of this invention is preferably carried out at ambient pressure and temperature, but elevated pressures and temperatures can be employed if desired. The exposure time can vary quite considerably, particularly with the catalyst and the amount of amino acid production desired.

In the following examples, the metal oxides used as catalyst was prepared by crushing to a fine powder in an agate mortar. For Example 1, the catalyst was preconditioned by heating at 300° C. for 24 hours under one atmosphere pressure of argon while the catalyst in Example 2 was preconditioned by heating at 500° C. for 24 hours under one atmosphere pressure of argon.

In Example 1, the cobalt oxide employed was a commercially available material from Mallinckrodt and the hematite employed was a conventional ore available from the Boston University Geology Department. In both Examples 1 and 2, the iron oxide employed was AR grade commercially available from Baker. In Example 2, the ferric-zeolite 5A material was from Linde which had been exchanged with Baker AR ferric chloride to replace sodium ions with ferric ions.

In both Examples 1 and 2, for the results of the runs which employed a metal oxide catalyst, the yields were not corrected for the water blank run set forth in the example.

In both Examples 1 and 2, the carbon dioxide, nitrogen, and argon employed are commercially available gases with the argon and nitrogen being pp grade. The water employed as the aqueous medium was bottled distilled water which had been further treated by deionization and evacuating for two hours.

In both Examples 1 and 2, a 150 watt xenon lamp filtered through a 420 nanometer cut-off filter was employed so that all visible light used in the process was equal to or greater than 420 nanometers. The xenon lamp was placed 30 centimeters from the reaction cell.

The catalyst suspensions for each run in both examples were illuminated or kept in the dark for the times indicated in the examples while the water-saturated nitrogen and carbon dioxide gas mixture was passed through the catalyst suspension at a pressure of one atmosphere and a rate of 52 milliliters per minute. This process was carried out at 26° C. The nitrogen and carbon dioxide were present in this reaction in a volumetric ratio of nitrogen to carbon dioxide of 4:1. In the water blank runs of both examples, no catalyst was present but the 4:1 nitrogen/carbon dioxide water-saturated gas mixture was passed through the water at the same reaction conditions of 26° C. and one atmosphere pressure under illumination from the xenon lamp for 24 hours.

After each run, the catalyst powders, if present, were removed from the suspensions by centrifugation and the supernatent solutions were evaporated to dryness in five milliliter test tubes on a water bath at 60° to 70° C. under flowing argon. The residues thus obtained from the catalyst suspensions and the water blanks were then taken up and 100 microliter aliquots of citrate buffer which were each then analyzed on a conventional Beckman Model 119C Amino Acid Analyzer. Products were identified and yields measured with the aid of conventional external standards. The 30 milliliter water blanks were bubbled, evaporated, and analyzed in the same manner. The amino acid products analyzed in this manner are reported in Examples 1 and 2 in the order of their elution. All yield numbers reported in both examples are in nanomoles.

Example I

| Amino Acid | Run 1 Water Blank Illum. 24 hrs. | Run 2 $Co_3O_4$ Illum. 24 hrs. | Run 3 $Fe_2O_3$ Illum. 3 hrs. | Run 4 $Fe_2O_3$ Illum. 24 hrs. | Run 5 Hematite Illum. 12 hrs. |
|---|---|---|---|---|---|
| Aspartic Acid | 0.1 | 0.1 | 1.1 | 6.0 | 5.7 |
| Threonine | 0.1 | 0.1 | 0.1 | 4.6 | 4.2 |

-continued

| Amino Acid | Run 1 Water Blank Illum. 24 hrs. | Run 2 $Co_3O_4$ Illum. 24 hrs. | Run 3 $Fe_2O_3$ Illum. 3 hrs. | Run 4 $Fe_2O_3$ Illum. 24 hrs. | Run 5 Hematite Illum. 12 hrs. |
|---|---|---|---|---|---|
| Serine | 3.1 | 2.5 | 4.1 | 25.2 | 23.4 |
| Glutamic Acid | 0.0 | 1.9 | 0.0 | 0.0 | 1.8 |
| Proline | 0.0 | 0.0 | 0.0 | 4.4 | 4.6 |
| Glycine | 5.6 | 6.1 | 8.8 | 22.3 | 18.4 |
| Alanine | 1.4 | 1.6 | 3.4 | 9.9 | 8.9 |
| Valine | 0.0 | 2.4 | 0.0 | 0.0 | 2.8 |
| Isoleucine | 0.0 | 0.0 | 0.3 | 1.0 | 0.4 |
| Leucine | 0.0 | 0.3 | 0.4 | 3.0 | 1.7 |
| Histidine | 0.0 | 0.0 | 0.3 | 0.7 | 0.5 |
| Lysine | 0.1 | 0.1 | 2.3 | 7.3 | 7.2 |
| Arginine | 0.0 | 0.0 | 0.2 | 1.5 | 1.8 |

Note that valine, leucine, isoleucine, threonine, and lysine were produced and that these amino acids are considered essential to human diets. Further note that catalyst Runs 2 through 5 produced considerably more amino acid than non-catalyst Run 1 even when the illumination time in Runs 3 and 5 was reduced.

Example II

| Amino Acid | Run 6 Water Blank Illum. 24 hrs. | Run 7 $Fe_2O_3$ Dark 12 hrs. | Run 8 $Fe_2O_3$ Dark 48 hrs. | Run 9 $Fe_2O_3$ Illum. 6 hrs. | Run 10 Fe(III) Zeolite 5A Illum. 24 hrs. |
|---|---|---|---|---|---|
| Aspartic Acid | 0.0 | 0.0 | 0.0 | 0.9 | 0.3 |
| Threonine | 0.0 | 0.0 | 0.5 | 0.7 | 0.9 |
| Serine | Trace | 0.2 | Trace | 3.6 | Trace |
| Glycine | Trace | 0.2 | 0.4 | 2.0 | 0.5 |
| Alanine | Trace | 0.0 | 0.0 | 0.8 | 0.0 |
| Isoleucine | 0.0 | 0.0 | 0.0 | 0.2 | 0.3 |
| Leucine | 0.0 | 0.0 | 0.0 | 0.3 | 0.0 |
| Histidine | 0.0 | 0.0 | 0.0 | 0.2 | 0.0 |
| Lysine | 0.0 | 0.0 | 0.0 | 0.8 | 0.0 |

Note that without light in Runs 7 and 8, essentially no amino acids were formed so that it is clear from both Examples 1 and 2 that both light and the catalyst of this invention are necessary for the production of amino acids in accordance with the process of this invention.

Reasonable variations and modifications are possible within the scope of this disclosure without departing from the spirit and scope of this invention.

We claim:

1. A method for making amino acids comprising providing a mixture of nitrogen, carbon dioxide and a source of hydrogen, and exposing said mixture to light in the presence of at least one Group VIII metal oxide, said exposure time, and exposure conditions, and the amount of said metal oxide present all being effective to form said amino acids.

2. The method of claim 1 wherein said source of hydrogen is liquid water.

3. The method of claim 2 wherein said source of hydrogen is vaporous water.

4. The method of claim 1 wherein said nitrogen and carbon dioxide are provided as exhaust gas from the combustion of a fossil fuel.

5. The method of claim 1 wherein said catalyst is employed in finely subdivided form.

6. The method of claim 2 wherein said catalyst is subdivided and dispersed in said liquid water and said mixture bubbled through said water while being exposed to said light.

7. The method of claim 1 wherein said catalyst is selected from the group consisting of oxides of cobalt, nickel, and combinations of two or more thereof.

8. The method of claim 7 wherein said catalyst is composed essentially of iron oxide.

9. The method of claim 8 wherein said oxide is predominately $Fe_2O_3$.

10. The method of claim 1 wherein said exposure is carried out at ambient pressure and temperature.

11. The method of claim 2 wherein said exposure is carried out at ambient pressure and an elevated temperature but below the boiling point of said liquid water.

12. The method of claim 1 wherein said light is sunlight.

13. The method of claim 1 wherein said metal oxide is first preconditioned by heating at ambient pressure in air, an inert atmosphere or hydrogen at a temperature of from about 20° C. to about 600° C. for at least 1 hour.

* * * * *